United States Patent [19]

Eisenhardt

[11] 4,002,206

[45] Jan. 11, 1977

[54] DITCHER

[75] Inventor: Fred W. Eisenhardt, Fargo, N. Dak.

[73] Assignee: Alloway Manufacturing, Inc., Fargo, N. Dak.

[22] Filed: Apr. 3, 1975

[21] Appl. No.: 564,829

Related U.S. Application Data

[62] Division of Ser. No. 474,048, May 28, 1974, abandoned.

[52] U.S. Cl. .................................. 172/90; 172/763
[51] Int. Cl.² ......................................... A01B 35/32
[58] Field of Search ..... 172/239, 90, 619, 624–629, 72/633, 763, 198, 439

[56] References Cited

UNITED STATES PATENTS

| 951,876 | 3/1910 | Arthur | 172/90 |
|---|---|---|---|
| 2,021,343 | 11/1935 | Wetzel | 172/90 |
| 2,197,429 | 4/1940 | Graham et al. | 172/195 |
| 2,246,617 | 6/1941 | Christiansen | 172/90 |
| 2,293,173 | 8/1942 | Rohlfs | 172/90 |
| 2,318,562 | 5/1943 | Silver et al. | 172/439 X |
| 2,362,728 | 11/1944 | Smith | 172/90 X |
| 2,837,989 | 6/1958 | Gann | 172/90 X |
| 2,852,995 | 9/1958 | Domries | 172/90 |
| 3,316,980 | 5/1967 | Frost | 172/90 |
| 3,500,936 | 3/1970 | Vigen | 172/198 |
| 3,642,333 | 2/1972 | Eisenhardt et al. | 172/763 X |
| 3,794,123 | 2/1974 | Whitesides | 172/624 |

FOREIGN PATENTS OR APPLICATIONS

| 128,489 | 1/1947 | Australia | 172/90 |
| 1,038,084 | 5/1953 | France | 172/90 |
| 527,897 | 6/1931 | Germany | 172/90 |

*Primary Examiner*—Paul E. Shapiro
*Attorney, Agent, or Firm*—Burd, Braddock & Bartz

[57] ABSTRACT

An earthworking implement mounted on a three-point hitch of a draft vehicle with a hitch assembly. The hitch assembly has L-shaped members mounted in clamps secured to a main transverse beam. A plurality of parallel linkages movably connect a transverse tool bar to the beam. Row guide units having resilient rubber wheels and furrowing tools are mounted with clamps to the tool bar. Earthworking tools are mounted with clamps to the tool bar. In one form, the earthworking tool is a blade sequentially moved into and out of the soil with a lifting wheel to dig water-holding basins or trenches in the soil.

27 Claims, 10 Drawing Figures

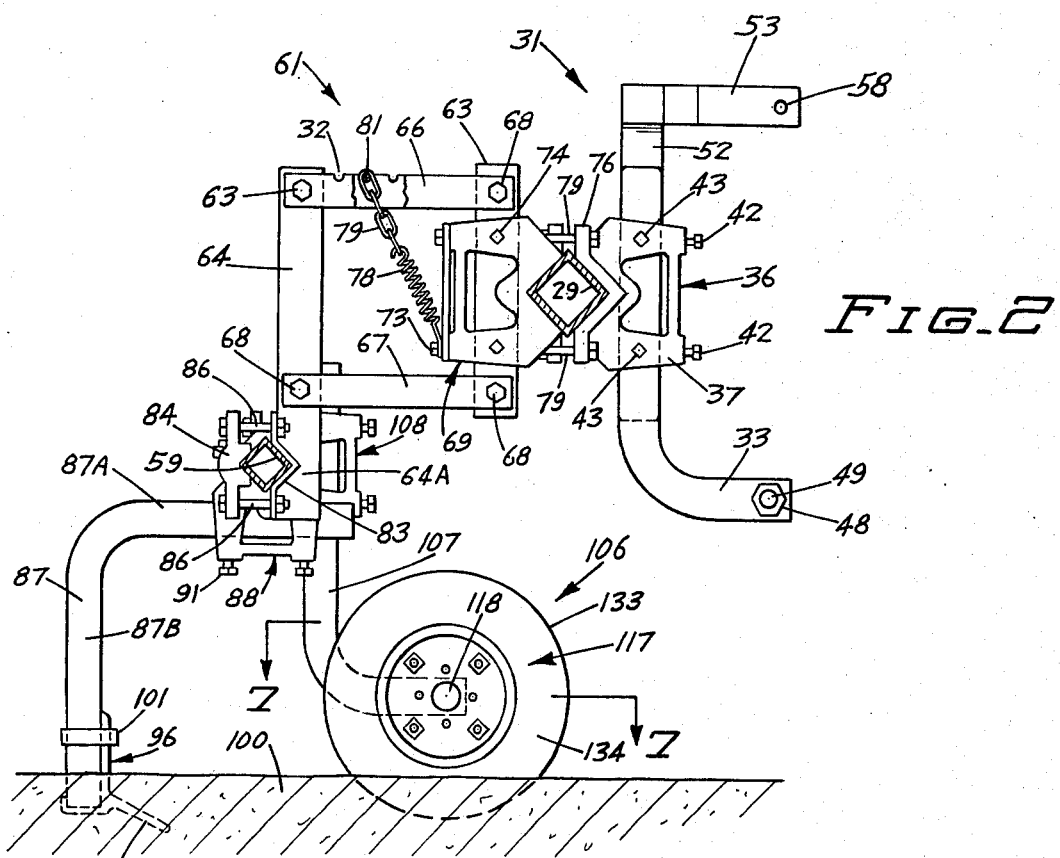

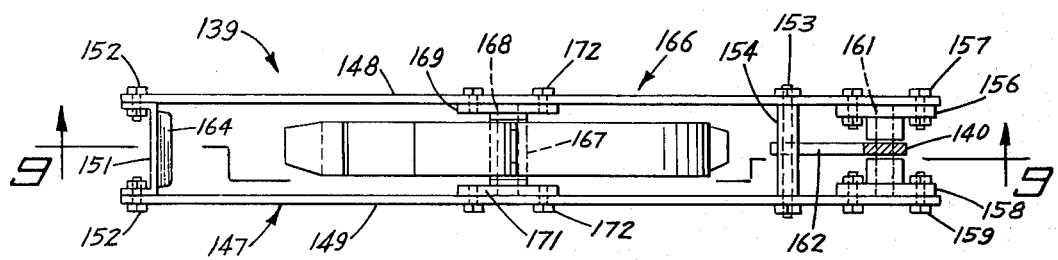
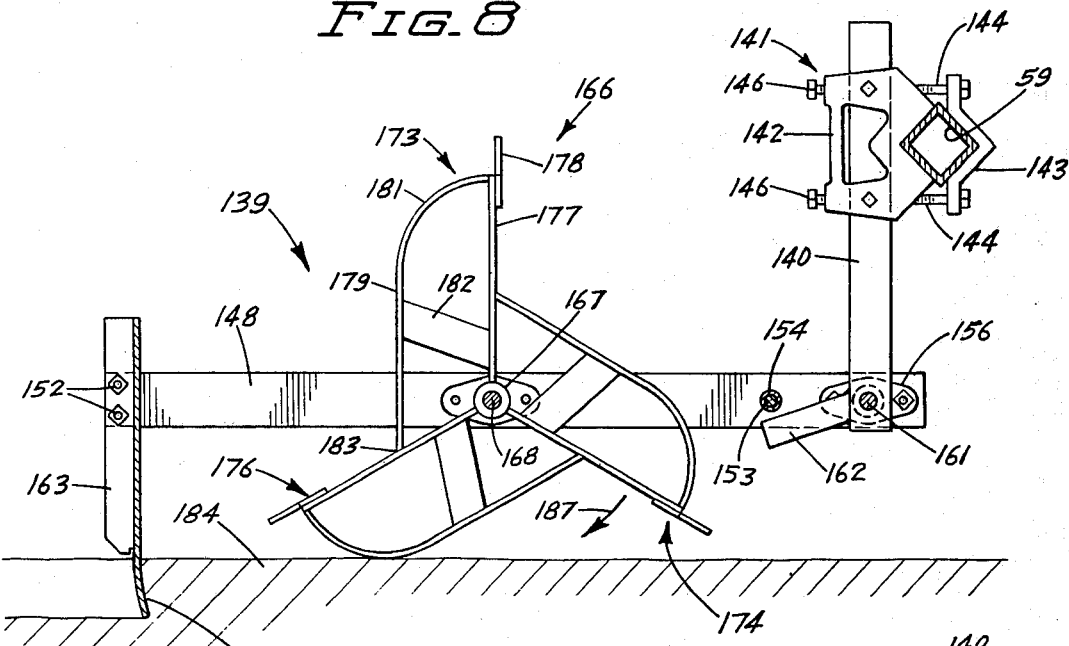
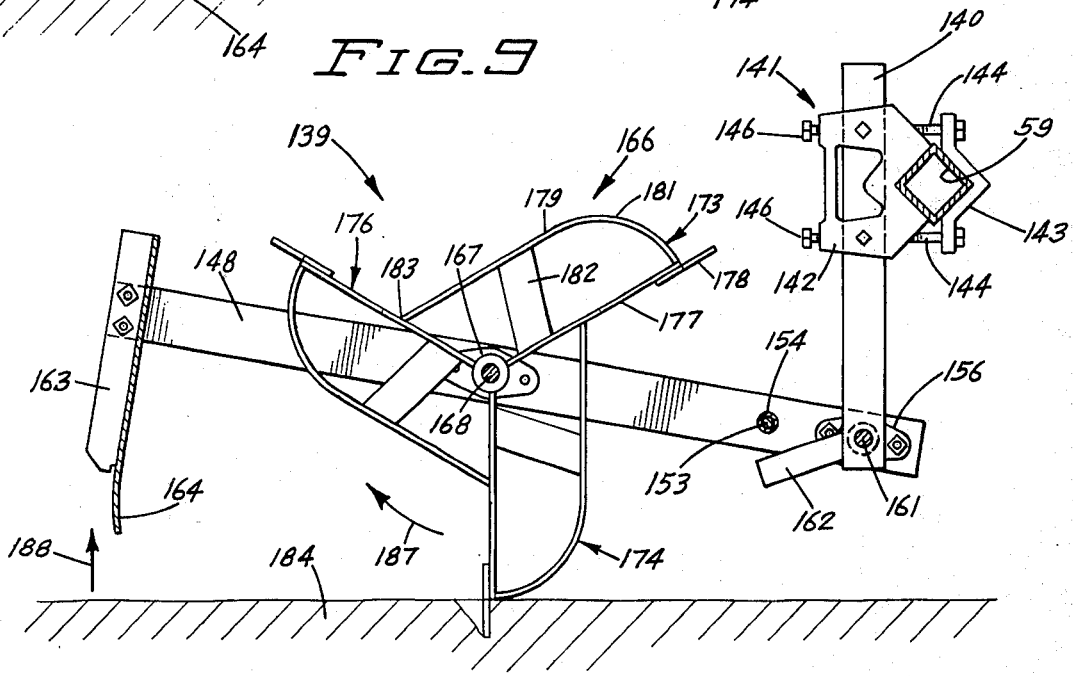

DITCHER

CROSS REFERENCE TO RELATED APPLICATION

This application is a division of U.S. patent application Ser. No. 474,048 filed May 28, 1974 now abandoned.

BACKGROUND OF INVENTION

Row crop cultivators mounted on three-point hitches of tractors are used to cultivate a plurality of rows of crops, as beets, beans, corn and the like. An example of a row crop cultivator is shown in U.S. Pat. No. 3,680,648. The cultivator has a plurality of earthworking tools mounted on a transverse tool bar. A row guide assembly comprising a wheel and furrowing tool is used to maintain the earthworking tools in proper relationship relative to the rows of crops.

Conservation farming systems utilizing ridge planning for row crops have been developed to optimize management of crop residues, minimize soil losses and erosion and lower farming costs. A prime mover, as a tractor or transporter, having all-terrain tires has a tool bar for carrying different types of equipment including earthworking equipment. The tires of the transporter follow the pre-established traffic patterns between the ridges of the row crops.

The basin method of planting row crops to control soil erosion and conserve soil moisture has been advocated for many years. The basin method and a basin lister is described by Shedd in the *Agricultural Engineering Journal*, Volume 16, No. 4, pages 133–136.

SUMMARY OF INVENTION

The invention relates to an earthworking implement attached to a draft vehicle with a hitch assembly. The hitch assembly has a plurality of L-shaped members adjustable connected with clamps to a main transverse beam. A tool bar is movably connected to the beam and carries a plurality of row guide units. Each row guide unit has a resilient rubber wheel and a furrowing tool. The rubber wheel has an annular chamber and is deformable so as to follow the furrows in the field. An earthworking tool means is secured to the tool bar for forming a separate trenches or basins in the soil to collect water and minimize water runoff and soil erosion. The earthworking tool has a rotatable wheel means operable to sequentially move the trenching tool in a generally upright direction to make separate trenches in the soil. The wheel means has a plurality of spoke members having outwardly projected soil-penetrating means and means to limit the amount of penetration of the soil-penetrating means.

An object of the invention is to provide a row crop cultivator with a row guide system that follows previously made furrows without side movement or drift. Another object of the invention is to provide an adjustable three-point hitch operable to level the transverse beam of a cultivator. A further object of the invention is to provide a versatile and adjustable three-point hitch assembly which can fit variations in three-point hitches and is adaptable to the other mounting structure of draft vehicles. A still further object of the invention is to provide an earthworking assembly operable to form separate trenches or basins in the soil. These and other objects and advantages of the invention are found in the following specification of a preferred embodiment of the invention.

IN THE DRAWINGS

FIG. 2 is a sectional view taken along the line 2—2 of FIG. 1;

FIG. 3 is a sectional view taken along the line 3—3 of FIG. 1;

FIG. 4 is an enlarged sectional view taken along the line 4—4 of FIG. 3;

FIG. 5 is an enlarged sectional view taken along the line 5—5 of FIG. 3;

FIG. 6 is a sectional view taken along the line 6—6 of FIG. 1;

FIG. 7 is an enlarged sectional view taken along the line 7—7 of FIG. 6;

FIG. 8 is a plan view of the earthworking apparatus of the invention;

FIG. 9 is a sectional view taken along the line 9—9 of FIG. 8 showing the earthworking tool in the down position; and FIG. 10 is a sectional view similar to FIG. 9 showing the earthworking tool in the raised position.

DESCRIPTION OF THE PREFERRED EMBODIMENT

Figure 1:
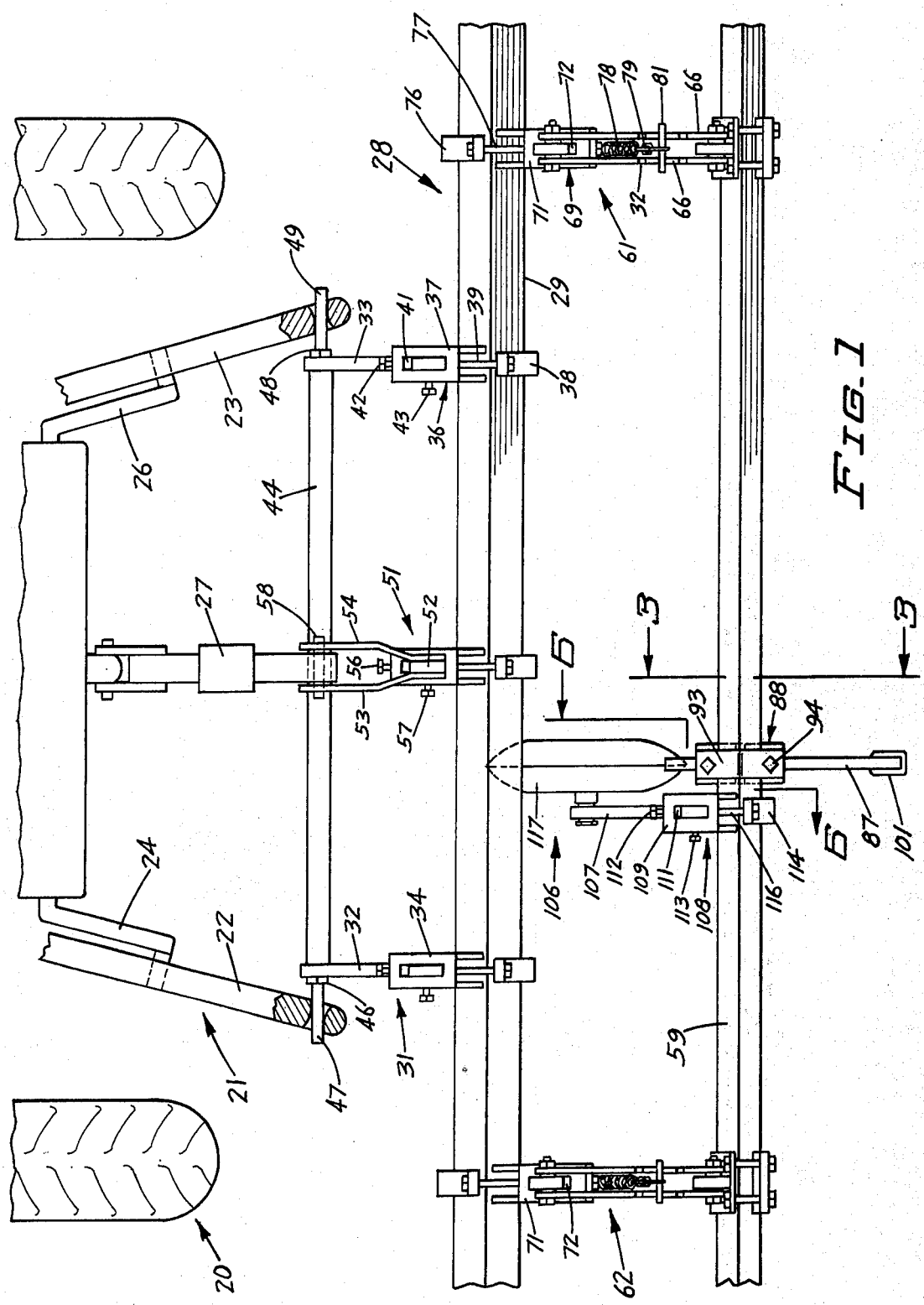
FIG. 1 is a plan view of a fragmentary portion of the earthworking implement of the invention attached to a three-point hitch of a draft vehicle.

Referring to the drawing, there is shown in FIG. 1 a transporter power unit or draft vehicle, as an agricultural tractor, indicated generally at 20 having a pair of drive wheels 20A located on opposite sides of the power transmission housing 20B. A conventional three-point hitch indicated generally at 21 extends rearwardly from the transmission housing 20B. Three-point hitch 21 has a pair of draft links 22 and 23 connected to lift links 24 and 26. Located between lift links 24 and 26 is a rearwardly directed center control link 27.

An earthworking implement indicated generally at 28 is mounted on three-point hitch 21. Implement 28 has a transverse beam 29 carrying a hitch assembly indicated generally at 31. Hitch assembly 31 is mounted on the draft links 22 and 23 and control link 27. Hitch assembly 31 comprises a pair of generally L-shaped members 32 and 33. A first clamp 34 secures the L-shaped member 32 to the beam 29. In a similar manner, a second clamp 36 secures the member 33 to beam 29. Clamps 34 and 36 are identical in structure. The following description is limited to clamp 36.

Clamp 36 is a clamp as shown in U.S. Pat. No. 3,642,333 or in U.S. patent application Ser. No. 176,169. Clamp 36 has a body 37 located on one side of beam 29. A back or retaining member 38 is located on the opposite side of beam 29. A pair of bolts 39 clamp the body 37 to member 38 to fix the position of the clamp on beam 29. The body 37 has an upright opening or passage 41 for accommodating the upright section 33A of the L-shaped member 33. Adjusting and holding bolts 42 cooperate with captive nuts (not shown) held in body 37 to engage the forward edge of upright section 33A and longitudinally clamp section 33A in the body 37. A pair of side adjusting and holding bolts 43 cooperate with nuts (not shown) captivated in body 37 and engage one side of section 33A to laterally or transversely clamp section 33A in body 37. L-shaped members 32 and 33 have forwardly directed sections or legs 32B and 33B, respectively. The forward portions of sections 32B and 33B have transverse holes for accommodating bolts (not shown) threaded into a transverse member 44. A bolt 46 holds one end of member 44 on section 32B. An outwardly directed end or projection 47 cooperates with the holding portion of the draft link 22 to mount one side of the hitch assembly 31 to draft link 22. The opposite end of member 44 is held on section 33B with a bolt 48. An outwardly directed arm or projection 49 cooperates with the end of draft link 23 to mount the opposite or right end, as shown in FIG. 1, on draft link 23.

A third clamp indicated generally at 51 is located midway between clamps 34 and 36. Clamp 51 accommodates upright L-shaped member 52 having a pair of forwardly directed arms 53 and 54. Adjusting and holding bolts 56 and 57 engage the front edge and side of upright member 52 to clamp the member 52 to the body of clamp 51. Clamp 51 is identical in structure to clamps 34 and 36. The forward ends of arms 53 and 54 have transverse aligned holes accommodating a pin 58. Pin 58 pivotally connects the control link 27 to the arms 53 and 54. Each of the upright portions 32A and 33A is selectively positioned in its respective clamp 34, 36, 51 so that the beam 29 can be leveled on the three-point hitch 21. The upright center member 52 is adjustable in clamp 51, thereby adjusting the location and elevation of the control link to provide for angular or pivotal control of the beam 29. The individual adjustment of the L-shaped members 32 and 33 and upright member 52 permits the hitch assembly 31 to fit variations in the structure of three-point hitches of different types of tractors.

As shown in FIGS. 1 and 2, a tool bar 59 is located generally parallel to, rearward and below the beam 29. A plurality of parallel linkages indicated generally at 61 and 62 connect tool bar 59 to beam 29. The number of parallel linkages can vary with the length of beam 29. Preferably, two parallel linkages are used for each section of tool bar 29. For example, a tool bar 59 having three sections would have six parallel linkages. Parallel linkages 61 and 62 are identical in structure. The following description is limited to parallel linkage 61 shown in FIG. 2.

Parallel linkage 61 has a first upright member 63 and a second upright member 64 located rearward of the first member 63. A first or top horizontal link 66 connects the upper ends of members 63 and 64. A second or bottom horizontal link 67 connects the lower end of member 63 with an intermediate portion of member 64. Pivot bolts 68 pivotally connect the opposite ends of members 66 and 67 to members 63 and 64.

A clamp indicated generally at 69 mounts the parallel linkage 61 to the beam 29. Clamp 69 is identical in structure to clamps 34 and 36. Clamp 69 has a body 71 having an upright opening or passage 72 for accommodating the upright member 63. Horizontal and transverse adjusting and holding bolts 73 and 74 fix the position of member 63 in the body 71. Clamp 69 has a back or retaining member 76 connected with a pair of bolts 77 to the body 71 to thereby fix the position of the clamp on beam 29.

The parallel linkage 61 is biased in a downward direction by a spring 78. The lower end of spring 78 is attached to the lower bolt 73. The upper end of spring 78 is connected to a link chain 79. A transverse rod 81 extends through one of the links. The ends of the rods are located in grooves 82 in the top links 66. The links 66 have a plurality of horizontally spaced grooves so that the position of rod 81 an be changed and thereby change the tension characteristics of spring 78.

The upright member 64 has a downwardly directed lower end 64A secured to a rearwardly open V-notched plate 83. The tool bar 59 is located in the V-notched plate. A back or retaining member 84 is clamped to the plate 83 with a plurality of bolts 86.

The guide system for the row crop implement comprises an earthworking tool 96 and a forwardly positioned guide wheel 117 located in longitudinal alignment with each other. A generally right angle standard 87 is used to attach tool 96 to tool bar 59. Standard 87 has a forwardly directed horizontal section 87A and a generally vertical section 87B. A clamp indicated generally at 88 attaches the standard 87 to the tool bar 59. Clamp 88, as shown in FIG. 3, has a body 89 having an opening or passage for accommodating forwardly directed portion or section 87A of standard 87. Adjusting bolts 91 and 92 vertically and horizontally fix the position of section 87A on body 89. A back or retaining member 93 is connected to body 89 with a pair of bolts 94. The bolts clamp the body and retaining member on tool bar 59.

Tool 96 is located on the lower end of standard section 87B. Tool 96 has an upwardly directed shank 97 having a rearwardly directed projection 98. Projection 98, as shown in FIG. 4, extends into a hole 99 in the standard section 87B. A continuous annular collar 101 extends about section 87B and shank 97 to hold the projection in hole 99. The collar 101 is frictionally held on the standard 97 and tool 96. The lower end of shank 97 is integral with a rearwardly directed base 102. Base 102 has an upwardly directed rib 103 located in a groove 104. As shown in FIG. 5, groove 104 is located in the bottom of standard section 87B. The tool 96 has a forwardly and downwardly directed nose 105 which extends into the soil 100.

Tool 96 is readily removed from standard 87. This is accomplished by forcing collar 101 in an upward direction. The tool can pivot in a forward direction so that the projection 98 is removed from hole 99. The tool can then be moved downwardly off the standard 87.

Referring to FIGS. 2, 6 and 7, the guide wheel assembly indicated generally at 106 has an upright generally L-shaped standard 107. Clamp 108 attaches the standard 107 to the tool bar 59. Clamp 108 is identical in structure to clamp 88. Clamp 108 has a body 109 having an opening 111 accommodating standard 107. Adjusting and holding bolts 112 and 113 fix the position of standard 107 on body 109. A back or retaining member 114 is connected to body 109 with a pair of bolts 116.

A guide wheel 117 is located adjacent the forward portion of the lower end of standard 107. Guide wheel 117 has a bearing or hub 118 attached to the standard 107 with nut and bolt assembly 119. The midsection of bearing 118 has an annular outwardly directed flange 121. The wheel is connected to flange 121. The wheel comprises a first rim 122 having an outside upwardly directed rib or flange 123. The inside of rim 122 has an inwardly directed circular flange 124. A second rim 126 has an outside outwardly directed flange 127 similar to flange 123. The inside of rim 126 has an inwardly directed flange 128. A plurality of circumferentially spaced nut and bolt assemblies 129 secure flanges 124 and 128 in face-to-face relationship. Lugs or bolts 131 connect both flanges 124 and 128 to the hub flange 121.

A resilient tire indicated generally at 132 is mounted on rims 122 and 126 between the flanges 123 and 127. The tire has a central outwardly directed apex 133 and convex sides 134 and 136. The base 138 of tire 132 extends between flanges 127 and 127. Tire 132 has an annular chamber 137. As shown in FIG. 7, chamber 137 has a generally triangular shape. The walls of the tire are flexible material, such as rubber or synthetic plastics. Also, the walls of the tire have substantially uniform thickness. The tire 132 follows the furrow previously made in the soil to thereby position the tool bar 59 relative to the rows of crops. The tool 96 functions to make a furrow for subsequent cultivation. The resilient tires function to follow the previously made furrow without cutting into the soil and drifting from the furrow. The resiliency of the tire permits it to deform and move over irregularities in the soil and obstacles without laterally shifting the position of the tool bar 59. This provides for accurate tracking of the cultivator and precision cultivation. The wheel 117 also functions as a guage wheel for determining the height of the tool bar 59. The height of the tool bar 59 is adjustable by repositioning standard 107 relative to the clamp 108.

The tool bar 59 can accommodate various types of earthworking tools. For example, the dual disc tools shown in U.S. Pat. No. 3,642,333 can be mounted on the tool bar 59. Referring to FIGS. 8–10, there is shown another type of earthworking assembly indicated generally at 139 mounted on the tool bar 59. The earthworking assembly 139 is operable to sequentially place holes or pockets in the soil to check water run-off and prevent soil erosion. In irrigation areas, the holes are used to collect the water between the rows of crops.

Earthworking assembly 139 has an upright standard 140. The upper end of standard 140 is connected to tool bar 59 with a clamp indicated generally at 141. Clamp 141 is identical in structure to clamp 88. Clamp 141 has a body 142 having an upright opening or passage for accommodating standard 140. A back or retaining member 143 is connected to body 142 with a pair of bolts 144. The bolts 144 mount clamp 141 on the tool bar 59. The body 142 carries adjusting and holding bolts 146 used to fix the position of the standard 140 on body 142. Located rearwardly of the lower end of standard 140 is a frame indicated generally at 147. Frame 147 has rearwardly directed side members 148 and 149. The rear portions of side members 148 and 149 are connected with a cross rear end member 151. The lower end of member 151 extends downwardly and forms a digging or lower end section 164. A plurality of bolts 152, attach member 151 to the side members 148 and 149. The forward ends of side members 148 and 149 are connected together with a transverse bolt 153. Bolt 153 extends through a sleeve 154 located between side members 148 and 149.

The side members 148 and 149 are pivotally connected to the lower end of standard 140 with a transverse shaft 161. Shaft 161 is located in a first bearing 156 and a second bearing 158. A plurality of bolts 157 connect the first bearing to side member 148. In a similar manner, bolts 159 connect the second bearing 158 to side member 149.

The lower end of standard 140 has a rearwardly and downwardly extended stop leg 162. The stop leg 162 has a length to engage the sleeve 154 to limit the downward movement of the frame 147.

The cross rear end member 151 forms with the lower end section 164 a digging or earthworking tool indicated generally at 163.

Located between the side members 148 and 149 is a rotatable lifting wheel indicated generally at 166. Wheel 166 has a center hub 167 rotatably mounted on a transverse axle 168. Axle 168 is secured to a first plate 169 and a second plate 171. Bolts 172 attach the plates to side members 148 and 149, respectively.

Wheel 166 has three outwardly directed spoke members 173, 174 and 176. The members 173, 174 and 176 are circumferentially spaced from each other approximately 120°. Each spoke member is identical in construction. The following description is limited to spoke member 173.

Spoke member 173 has a radial plate 177. An outwardly directed cleat or lug 178 is attached to the outer end of plate 177. Positioned rearwardly of plate 177 is a back 179. The outer end of back 179 has a forwardly curved section 181 attached to the outer end of plate 177. A brace 182 connects the midsection of back 179 to the inner end of plate 177. The inner end of back 179 is secured at 173 to a midsection of adjacent radial plate 177A.

In use, on forward movement of the implement over the soil 184, as indicated by arrow 186, the lifting wheel 166 will be rotated in the direction of arrow 187. As wheel 166 rotates, it pivots the frame 147 about the axle 161 in upward and downward directions, as indicated by arrow 188. This sequentially raises and lowers the digging tool 163 into and out of the soil, thereby producing a series of longitudinal basins or trenches in the soil. The lugs 178 dig into the soil. The curved section 181 functions as a stop or gauge to prevent the lugs 178 from moving deep into the soil and thereby preventing lifting of the earthworking tool 163 from the soil. The circumferential space between the back 179 and adjacent plate 177 is a sufficient distance so that the frame 147 will quickly and forcefully move down, thereby forcing the earthworking tool 163 into the soil. This produces a sharp depression or trench in the soil as the tool is quickly moved into and out of the soil as the implement is moved in the forward direction.

While there has been shown and described a preferred embodiment of the implement, it is understood that modifications, changes in material and size of parts may be made by those skilled in the art without departing from the invention.

The embodiments of the invention in which an exclusive property or privilege is claimed are defined as follows:

1. An earthworking implement comprising: a frame, a support, means movably connecting the frame to the support whereby the frame can move in a generally upright direction, earthworking tool means secured to the frame for forming trenches in the soil, wheel means movably mounted on the frame for sequentially moving the tool means up and down in said generally upright direction to make separate trenches in the soil, said wheel means including a wheel having a center hub, means rotatably mounting the center hub on the frame, said wheel having a plurality of spoke members, each spoke member including a radial member secured to the hub and outwardly projected soil penetrating means secured to the outer end of the radial member, and means to limit the amount of penetration of the soil penetrating means, said means to limit the amount of penetration comprising a back member located behind each radial member inwardly and rearwardly from the soil penetrating means, each back member having a convex curved outer section secured to the outer end of a radial member and an inner end secured to the adjacent radial member.

2. The implement of claim 1 wherein: the frame is a generally rectangular frame unit having laterally spaced side members with forward ends and rear ends, said means movably connecting the frame to the support being attached to the forward ends of the frame unit, said earthworking tool means attached to the rear ends of the frame unit side members, said wheel being rotatably mounted on the side members between the ends thereof.

3. The implement of claim 2 wherein: the tool means is a generally U-shaped member secured to the rear ends of the side members.

4. The implement of claim 2 wherein: the tool means is a downwardly projected blade member secured to the rear ends of the side members.

5. The implement of claim 1 wherein: the support has a fixed stop, said frame having means engageable with the stop to limit downward movement of the frame.

6. The implement of claim 1 wherein: the support includes an upright standard.

7. The implement of claim 1 wherein: the frame has laterally spaced side members, the support has a rearwardly directed fixed stop projected between the side members, and means located above the stop secured to the side members and engageable with the stop to limit downward movement of the frame.

8. The implement of claim 1 including: brace means extended between and secured to the radial member and back member.

9. The implement of claim 1 wherein: the soil penetrating means is a radially projected lug.

10. The implement of claim 1 wherein: the wheel has three spoke members arcuately spaced from each other generally the same circumferential distance.

11. The implement of claim 1 including: clamp means for attaching the support to a tool bar, said clamp means having first means to longitudinally hold the support and second means to transversely hold the support.

12. The implement of claim 1 wherein: said inner end of the back member is secured to the midsection of the adjacent radial member.

13. An earthworking implement comprising: a frame, a support, means movably connecting the frame to the support whereby the frame can sequentially move up and down in a generally upright direction, earthworking tool means secured to the frame for forming trenches in the soil, a single wheel means movably mounted on the frame for sequentially moving the tool means up and down in said generally upright direction to make separate trenches in the soil when the implement is moved in a forward direction, means rotatably mounting the wheel means on the frame, said wheel means having a center hub, a plurality of radial spoke members secured to the hub and outwardly projected soil penetrating means, and means to limit the amount of penetration of the soil penetrating means whereby the rotating wheel means sequentially moves the frame up and down so that the tool means forms a series of separate trenches in the soil, said means to limit the amount of penetration including a back member located behind each spoke member, each back member having a convex curved outer section secured to the outer end of the radial member and an inner end secured to the adjacent spoke member.

14. The implement of claim 13 wherein: the frame is a generally rectangular frame unit having laterally spaced side members with forward ends and rear ends, said means movably connecting the frame to the support being attached to the forward ends of the frame unit, said earthworking tool means attached to the rear ends of the side members, said wheel means being rotatably mounted on the side members between the ends thereof.

15. The implement of claim 14 wherein: the tool means is a generally U-shaped member secured to the rear ends of the side members.

16. The implement of claim 14 wherein: the tool means is a downwardly projected blade member secured to the rear ends of the side members.

17. The implement of claim 13 wherein: the support has a fixed stop, said frame having means engageable with the stop to limit downward movement of the frame.

18. The implement of claim 13 wherein: the support includes an upright standard.

19. The implement of claim 13 wherein: the frame has laterally spaced side members, the support has a rearwardly directed fixed stop projected between the side members, and means located above the stop secured to the side members and engageable with the stop to limit downward movement of the frame.

20. The implement of claim 13 including: brace means extended between and secured to the radial member and back member.

21. The implement of claim 13 wherein: the soil penetrating means is a radially projected lug.

22. The implement of claim 13 including: clamp means for attaching the support to a tool bar, said clamp means having first means to longitudinally hold the support and second means to transversely hold the support.

23. The implement of claim 13 wherein: said inner end of the back member is secured to the midsection of the adjacent spoke member.

24. An earthworking implement for making separate trenches in the soil comprising: a frame unit having laterally spaced side members, said side members having forward ends and rear ends, an upright support, means pivotally mounting the forward ends of the side members to the lower portion of the support whereby the frame units can sequentially pivot up and down in a generally vertical direction, earthworking tool means secured to the frame unit for forming separate trenches in the soil, wheel means for sequentially moving the frame unit and tool means up and down in a generally vertical direction to make separate trenches in the soil when the implement is moved in a forward direction, means rotatably mounting the wheel means on the frame unit between the ends thereof for rotation about a horizontal transverse axis, said wheel means having a center hub rotatably mounted on the side members between the ends thereof, a plurality of radial members secured to the hub, soil penetrating means being secured to the outer ends of each radial member, and a back member located behind each radial member for limiting the amount of penetration of the soil penetrating means, each back member having a convex curved outer section secured to the outer end portion of the radial member and an inner end secured to the adjacent radial member, a stop leg secured to the lower portion of the support, said stop leg extended rearwardly between the side members, and means located above the stop leg and secured to the side members and engageable with the stop leg to limit downward movement of the frame unit, earthworking tool means and wheel means.

25. The implement of claim 24 wherein: the tool means is a generally U-shaped blade member secured to the rear ends of the side members.

26. The implement of claim 24 including: brace means extended between and secured to each radial member and back member located behind each radial member.

27. The implement of claim 24 wherein: the wheel means has three spoke members arcuately spaced from each other generally the same circumferential distance.

* * * * *